(12) United States Patent
Wang (10) Patent No.: US 11,705,017 B2
(45) Date of Patent: Jul. 18, 2023

(54) SUPPLY CHAIN MANAGEMENT INSTRUCTIONAL BOARD GAME

(71) Applicant: Morgan State University, Baltimore, MD (US)

(72) Inventor: Ziping Wang, Baltimore, MD (US)

(73) Assignee: Morgan Sate University, Baltimore, MD (US)

( * ) Notice: Subject to any disclaimer, the term of this patent is extended or adjusted under 35 U.S.C. 154(b) by 150 days.

(21) Appl. No.: 16/001,090

(22) Filed: Jun. 6, 2018

(65) Prior Publication Data
US 2018/0350263 A1    Dec. 6, 2018

Related U.S. Application Data
(60) Provisional application No. 62/515,865, filed on Jun. 6, 2017.

(51) Int. Cl.
*G09B 19/18* (2006.01)
*A63F 3/00* (2006.01)

(52) U.S. Cl.
CPC .......... *G09B 19/18* (2013.01); *A63F 3/00063* (2013.01); *A63F 2003/00066* (2013.01); *A63F 2250/133* (2013.01)

(58) Field of Classification Search
CPC ....................................................... A63F 3/00
See application file for complete search history.

(56) References Cited

U.S. PATENT DOCUMENTS

| | | | |
|---|---|---|---|
| 2,657,057 | A | 10/1953 | Chapin |
| 5,092,606 | A | 3/1992 | Miller |
| 5,224,710 | A | 7/1993 | Feokhari |
| 5,246,373 | A | 9/1993 | Becker |
| 5,273,431 | A | 12/1993 | Charouhas |
| 5,471,968 | A | 12/1995 | Lee |
| 5,516,290 | A | 5/1996 | Quigley et al. |
| 6,206,371 | B1 | 3/2001 | Dove |
| 6,279,908 | B1 | 8/2001 | Hunsberger |
| 6,447,300 | B1 | 9/2002 | Greenberg |
| 6,910,893 | B2 | 6/2005 | Dillhoff |
| 7,874,892 | B2 | 1/2011 | Hippely |
| 9,220,973 | B1 | 12/2015 | Stringer |

(Continued)

*Primary Examiner* — Eugene L Kim
*Assistant Examiner* — Christopher Glenn
(74) *Attorney, Agent, or Firm* — Whiteford, Taylor & Preston, LLP; Gregory M. Stone (57) ABSTRACT

Disclosed is an educational board game having a game surface and associated physical gaming elements that cooperatively simulate distinct phases of a supply chain, in which different physical gaming elements and game board segments correspond to those distinct supply chain phases. Mating, player-specific (e.g., color coded) material game pieces represent materials that may be combined to form a simulated product. Combined game pieces representing player-specific products may then be moved across the game board with players paying various supply chain costs and receiving payment for product sales through the segments of the supply chain. A random number generator, such as one or more dice, in combination with various cards, are used by the players to determine the occurrence of various supply chain risks, values, and projections as the players progress through the segments of the supply chain to ultimate sale of finished products.

7 Claims, 7 Drawing Sheets

(56) References Cited

U.S. PATENT DOCUMENTS

2008/0042349 A1\* 2/2008 Killgo .................. A63F 3/0434
 273/243
2008/0136100 A1\* 6/2008 Jorgensen ........... A63F 3/00214
 273/241
2010/0289216 A1\* 11/2010 Charney ............. A63F 3/00006
 273/237

\* cited by examiner

SUPPLY CHAIN MANAGEMENT INSTRUCTIONAL BOARD GAME

CROSS REFERENCE TO RELATED APPLICATIONS

This application is based upon and claims the benefit of U.S. Provisional Application No. 62/515,865 titled "Supply Chain Management Instructional Board Game," filed with the United States Patent & Trademark Office on Jun. 6, 2017, the specification of which is incorporated herein by reference in its entirety.

FIELD OF THE INVENTION

This invention is directed to instructional and educational games, and more particularly to a board game having play elements and an associated method particularly configured to simulate various distinct phases of a product supply chain.

BACKGROUND OF THE INVENTION

Board games have long provided both children and adults with hours of entertainment, and have been provided in wide varieties of categories. However, while entertaining games certainly have value, even greater value may be provided by games that grab a player's interest while offering an educational platform for the player to learn a new skill or field. More particularly, for students attempting to learn difficult or complex subject matter, educational games may offer a unique tool for conveying such complex subject matter in a more comprehensible manner, particularly if the game is able to break the subject matter into more easily digestible educational segments.

A wide variety of games have been previously made available that attempt to educate the player with respect to a particular subject matter. For example, U.S. Pat. No. 5,092,606 to Miller describes a board game in which players' tokens advance through a game path of connected spaces by correctly answering questions designed to teach and challenge a player knowledge of the Bible. U.S. Pat. No. 5,246,373 to Becker describes a board game in which players select cards with questions configured to direct children and others as to the merits and availability of emergency dialing for emergency assistance. U.S. Pat. No. 5,273,431 to Charouhas describes an educational linguistic board game in which players advance through the game by answering questions designed to educate the players in the correct spelling and usage of various English words and phrases to improve linguistic ability. U.S. Pat. No. 5,516,290 to Quigley et al. discloses an educational board game in which players advance along the board while learning terms relating to skateboarding and the impact of using safety equipment while skateboarding. U.S. Pat. No. 6,279,908 to Hunsberger discloses an educational board game in which players advance along the board by correctly answering questions designed to test a player's knowledge of diabetes. U.S. Pat. No. 6,447,300 to Greenberg discloses an educational card game including a deck of cards with various mathematic symbols thereon configured to teach children arithmetic. U.S. Pat. No. 6,910,893 to Dillhoff discloses an educational card game that combines a traditional 52 card deck with educational information on the cards in various educational topics. Finally, U.S. Pat. No. 9,220,973 discloses an educational board game in which players advance along the board by correctly answering questions or performing tasks indicated on cards provided with the game.

Notwithstanding the foregoing, there remains a need for a game that may hold the interest of players while simultaneously serving the purpose of educating the players on the complex aspects of managing supply chains, and more particularly that separately address the various segments of a supply chain including material supply, manufacturing, distribution, and sales, and the interaction of those supply chain segments with one another.

SUMMARY OF THE INVENTION

Disclosed is an educational board game having a game surface and associated physical gaming elements that cooperatively simulate distinct phases of a supply chain, in which different physical gaming elements and game board segments correspond to those distinct supply chain phases. Game play is carried out using the physical gaming elements so as to maintain a correlation affect between those supply chain phases, where actions taken with or as a result of game elements in one part of the game affect simulated supply chain segment results in other parts of the game.

In accordance with certain aspects of an embodiment, an educational game simulating segments of a supply chain includes a game board that is segmented into sections, each of which represents a supply chain phase, and more particularly a material supplier panel, a product manufacturer panel, a product distribution panel, and a market panel. Mating, player-specific (e.g., color-coded) material game pieces represent materials that may be combined to form a simulated product. Combined game pieces representing player-specific simulated products may then be moved across the game board through a game path representing the various supply chain segments, with players paying various supply chain costs and receiving payment for product sales through the segments of the supply chain. A random number generator, such as one or more dice, in combination with various cards (e.g., market demand cards and product price cards) and game pieces (e.g., supplier insurance, spot market, production defects, transportation mode, and marketing effort game pieces), are used by the players to determine the occurrence of various supply chain risks, values, and projections as the players progress through the segments of the supply chain to ultimate sale of finished products.

In accordance with an embodiment of the invention, a method for playing an educational supply chain management board game is provided, comprising: providing a game board comprising a plurality of panels, each panel including indicia designating a distinct phase of a supply chain, and each panel including at least one set of a plurality of player spots, each player spot in each set including a distinct color that may be associated with a single player; providing a plurality of first components, each said component having a flat base, the plurality of first components being provided in color-coded sets matching the distinct colors of the plurality of player spots; providing a plurality of second components equal in number and color to the plurality of first components, each second component having a flat top side and a flat bottom side, wherein the flat top side of each second component is sized to receive a flat base of one of the first components thereon; associating one of the distinct colors of the player spots with each one of a plurality of players of the game; causing the players to purchase at a start of the game board, using game funds, a player-designated number of first components and second components to meet a player estimated market demand; causing the players to pay, using game funds, for manufacture of final products equal in number to each player estimated market demand, and causing the players to combine each one of the first components with an associated one of the second components to represent one or more of the final products; causing the players to randomly determine a realized demand for at least one market segment; and causing the players to collect revenue from sales of each player's final products equal in number to the player's final product inventory, up to the realized demand, at an end of the game board.

In accordance with further aspects of an embodiment of the invention, an educational supply chain management board game is provided, comprising: a game board comprising a plurality of panels, each panel including indicia designating a distinct phase of a supply chain, and each panel including at least one set of a plurality of player spots, each player spot in each set including a distinct color that may be associated with a single player, the plurality of panels further comprising: a first panel including indicia designating the first panel as a material supplier supply chain segment panel; a second panel attached to the first panel and including indicia designating the second panel as a product manufacturing supply chain segment panel; a third panel attached to the second panel and including indicia designating the third panel as a product distribution supply chain segment panel; and a fourth panel attached to the third panel and including indicia designating the fourth panel as a market supply chain segment panel; a plurality of first components, each component having a flat base, the plurality of first components being provided in color-coded sets matching the distinct colors of the plurality of player spots; a plurality of second components equal in number and color to the plurality of first components, each second component having a flat top side and a flat bottom side, wherein the flat top side of each second component is sized to receive a flat base of one of the first components thereon; and at least one random number generator.

Still other aspects, features and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The numerous advantages of the present invention may be better understood by those skilled in the art by reference to the accompanying drawings in which.

DETAILED DESCRIPTION

The invention summarized above may be better understood by referring to the following description, claims, and accompanying drawings. This description of an embodiment, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Disclosed herein is an educational board game simulating various segments of a product supply chain. The supply chain simulation educational game system includes a game board that accelerates a player's familiarization with and recollection of the material supply, product manufacture, product distribution, and market segments of a supply chain. The game play methodology enables players to experience how a product is ultimately brought to market through the various segments of the supply chain, including how demand forecasting affects overall income, how material costs and supply risks affect overall income, how production risks affect overall income, how use of varied distribution channels affect income, how user-determined prices in different markets affect income, and how realized, variable product demand in differing market segments affects income.

Figure 1:
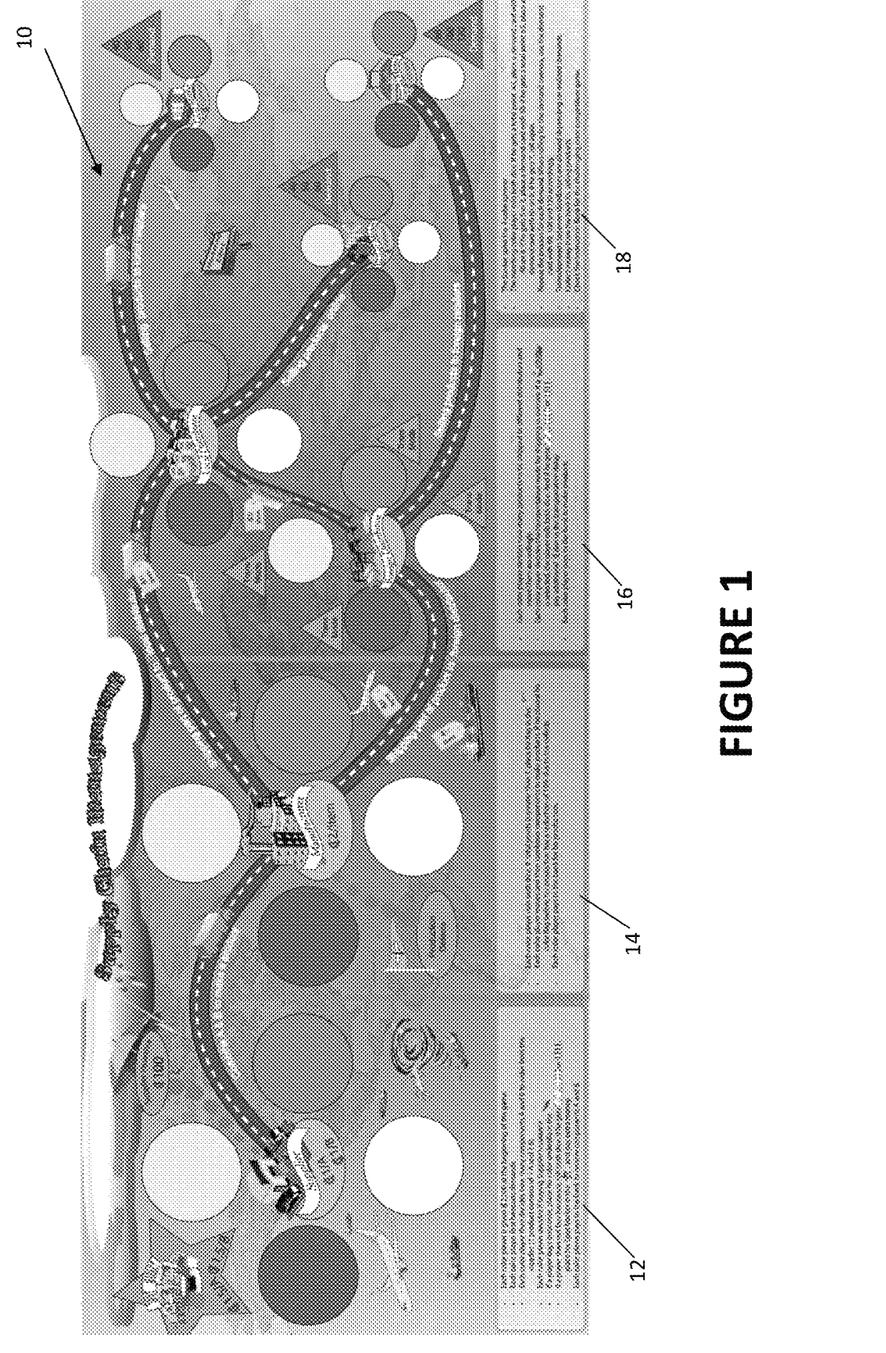
FIG. 1 is a top view of a game board in accordance with certain aspects of an embodiment of the invention.

FIG. 1 shows a game board 10 in accordance with certain aspects of an embodiment of the invention. Game board 10 is segmented into multiple panels that depict differing segments of a supply chain—specifically, a first panel 12 depicting a material supplier segment of a supply chain, a second panel 14 depicting a product manufacturing segment of a supply chain, a third panel 16 depicting a product distribution segment of a supply chain, and a fourth panel 18 depicting a market segment of a supply chain. Preferably, first panel 12, second panel 14, third panel 16, and fourth panel 18 may be hinged at long edges to one another to form a continuous game board surface, while allowing folding of the game board 10 into a compact size for storage.

Figure 1A:
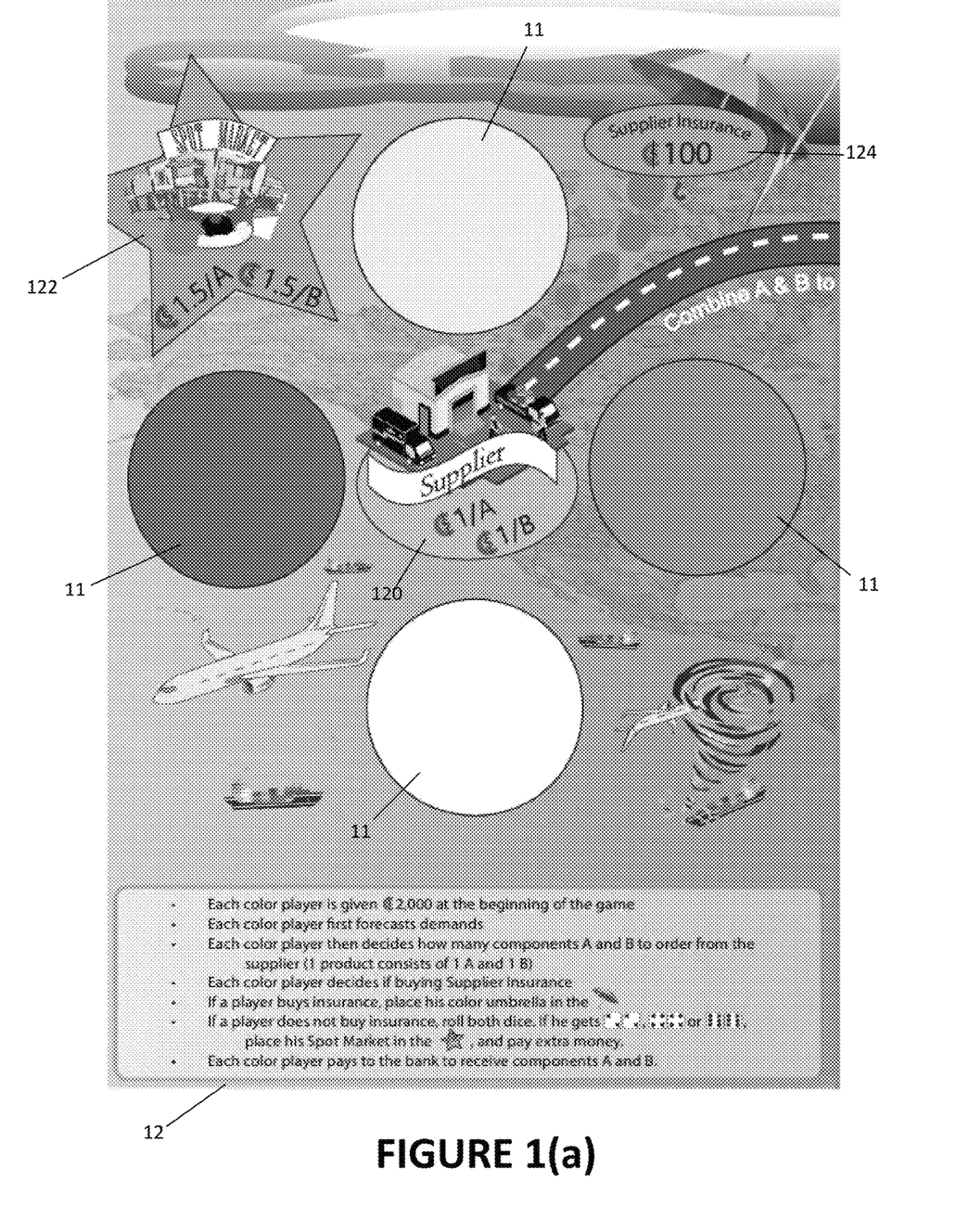
FIG. 1a is a top, close-up view of a first game board panel of the game board of FIG. 1 reflecting a material supplier segment panel.

FIG. 1A is a close up view of first panel 12 depicting a material supplier segment of a supply chain. First panel 12 includes at least one supply chain segment indicia 120, which may represent a material supplier segment of a supply chain. A plurality of player spaces 11 are also provided on first panel 12, each of which player spaces 11 is provided in a different color so as to be assignable to and associated with one of multiple players of the game. Material supply segment effector spaces 122 and 124 are also provided on first panel 12. More particularly, effector space 122 may designate a spot market designator location, in which one or more color-coded spot market game pieces that are associated with a player assigned to one of player spaces 11 may be placed to indicate that a player will pay an additional price, or "spot price," to obtain component pieces for manufacturing hypothetical products during game play. Likewise, effector space 124 may designate a supplier insurance designator location, in which one or more color-coded supplier insurance game pieces that are associated with a player assigned to one of player spaces 11 may be placed to indicate that a player will pay an established "insurance" fee to avoid risk of being forced to pay an additional "spot price" for component pieces, as discussed in greater detail below.

Figure 1B:
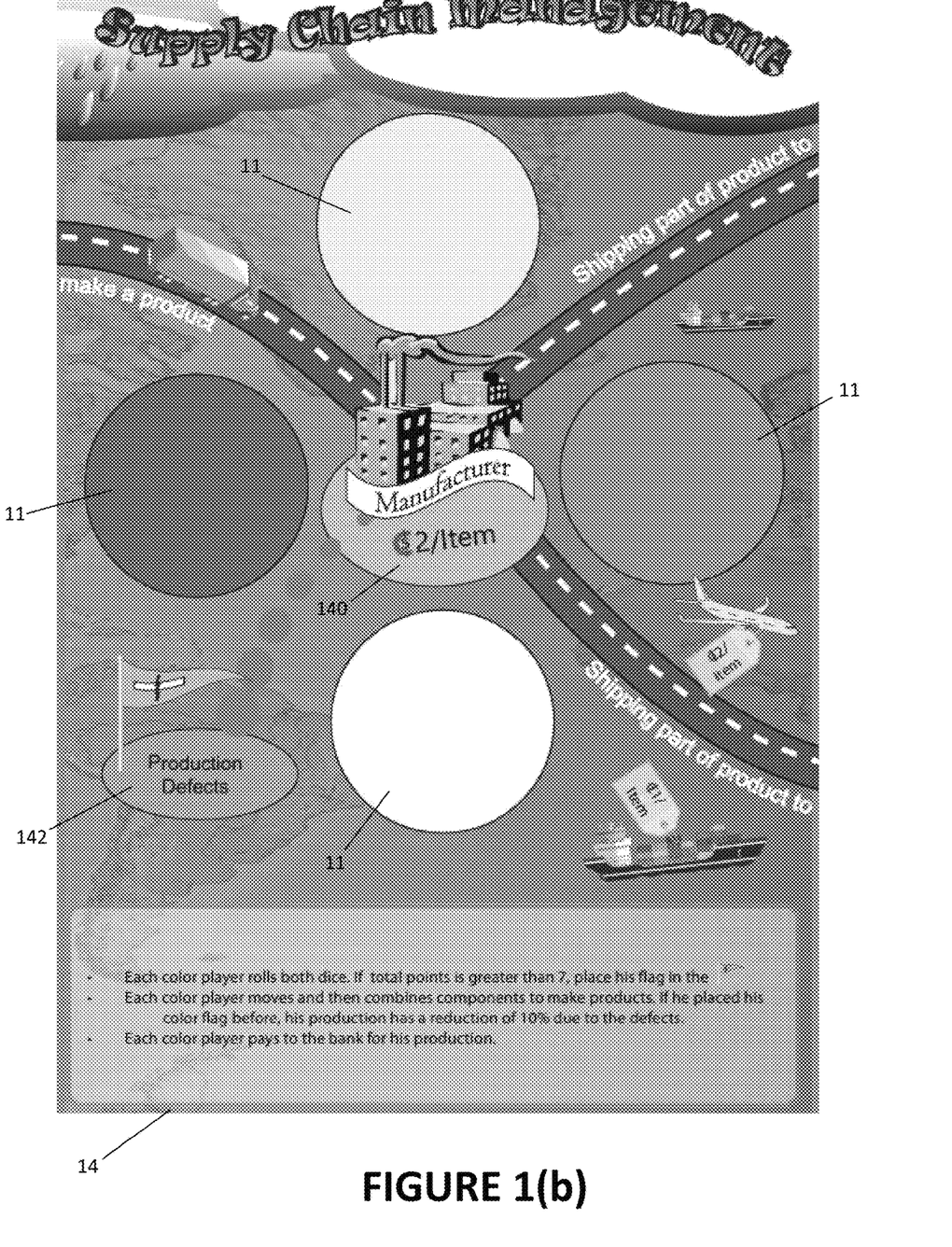
FIG. 1b is a top, close-up view of a second game board panel of the game board of FIG. 1 reflecting a product manufacturing segment panel.

Next, FIG. 1B is a close up view of second panel 14 depicting a product manufacturing segment of a supply chain. Second panel 14 includes at least one supply chain segment indicia 140, which may represent a product manufacturing segment of a supply chain. A plurality of player spaces 11 are again provided on second panel 14, each of which player spaces 11 is provided in a different color so as to be assignable to and associated with one of multiple players of the game, and more particularly in the same colors as player spaces 11 of first panel 12. A product manufacturing segment effector space 142 is also provided on second panel 14. More particularly, effector space 142 may designate a production defects designator location, in which one or more color-coded production defect game pieces that are associated with a player assigned to one of player spaces 11 may be placed to indicate that a player will produce a modified number of completed products, and more particularly a lower number of completed products, for a preset production price during game play, as discussed in greater detail below.

Figure 1C:
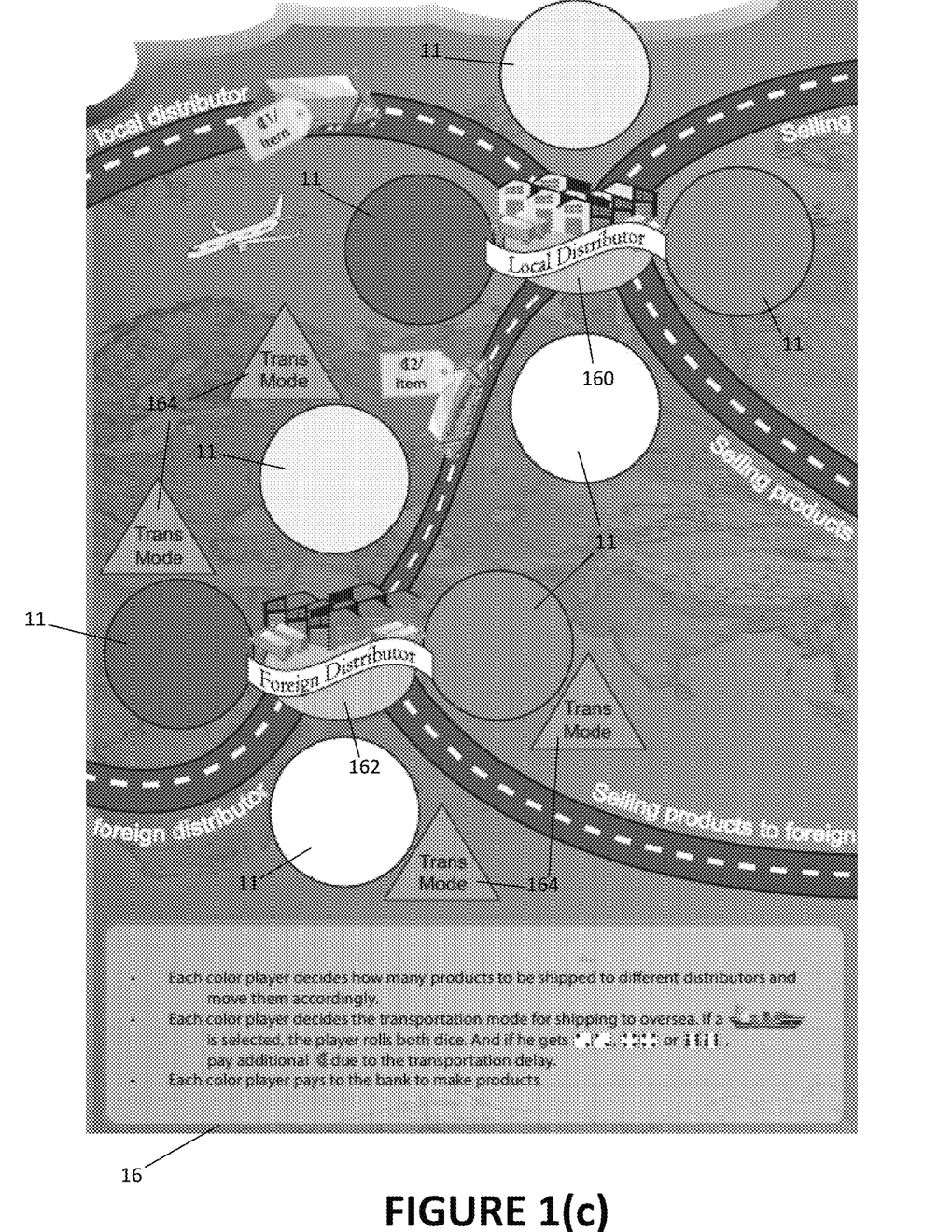
FIG. 1c is a top, close-up view of a third game board panel of the game board of FIG. 1 reflecting a product distribution segment panel.

Next, FIG. 1C is a close up view of third panel 16 depicting a product distribution segment of a supply chain. Third panel 16 includes a plurality of supply chain segment indicia 160 and 162, which may represent a product distribution segment of a supply chain. More particularly, supply chain segment indicia 160 may represent a local product distribution segment of a supply chain, and supply chain segment indicia 162 may represent a foreign distribution segment of a supply chain. A plurality of player spaces 11 are again provided on third panel 16 surrounding each of supply chain segment indicia 160 and 162, each of which player spaces 11 is provided in a different color so as to be assignable to and associated with one of multiple players of the game, and more particularly in the same colors as player spaces 11 of first panel 12 and second panel 14. Product distribution segment effector spaces 164 are also provided on third panel 16, each of which is associated with one of the player spaces 11 surrounding supply chain segment 162. More particularly, effector spaces 164 may receive a color-coded transport mode game piece (e.g., one of either an air transport mode game piece or a sea transport mode game piece), to in turn designate a transport mode for transportation of products supply chain segment 162 (representing a foreign distribution segment). Designation of such transport mode may be used to modify a price a player pays for transport of products to such foreign distribution segment of the supply chain represented on game board 10, as discussed in greater detail below.

Figure 1D:
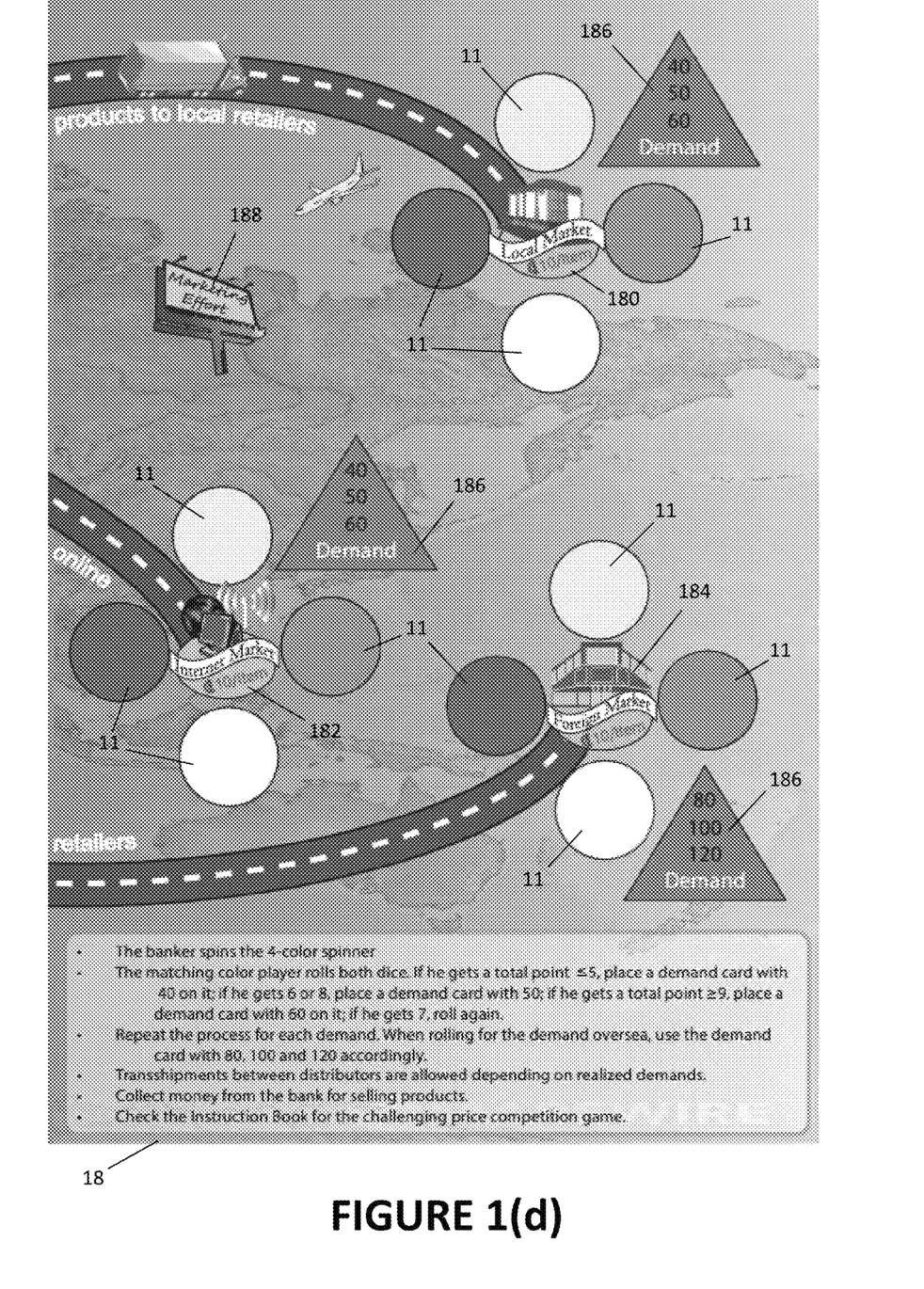
FIG. 1d is a top, close-up view of a fourth game board panel of the game board of FIG. 1 reflecting a market segment panel.

Finally, FIG. 1D is a close up view of fourth panel 18 depicting a market segment of a supply chain. Fourth panel 18 includes a plurality of supply chain segment indicia 180, 182, and 184, which may represent a market segment of a supply chain. More particularly, supply chain segment indicia 180 may represent a local market segment of a supply chain, supply chain segment indicia 182 may represent an online or Internet market segment of a supply chain, and supply chain indicia 184 may represent a foreign market segment of a supply chain. A plurality of player spaces 11 are again provided on fourth panel 18 surrounding each of supply chain segment indicia 180, 182, and 184, each of which player spaces 11 is provided in a different color so as to be assignable to and associated with one of multiple players of the game, and more particularly in the same colors as player spaces 11 of first panel 12, second panel 14, and third panel 16. Market segment effector spaces 186 are also provided on fourth panel 18, each of which is associated with one of the supply chain segment indicia 180, 182, and 184. More particularly, effector spaces 186 may receive a card labeled with a number reflecting product demand that is associated with a given market associated with each of market segment indicia 180, 182, and 184. As discussed below, a plurality of cards with varying product demand values may be provided and may be selected during game play by, for example, use of one or more random number generators, such as a pair of dice.

Figure 2:
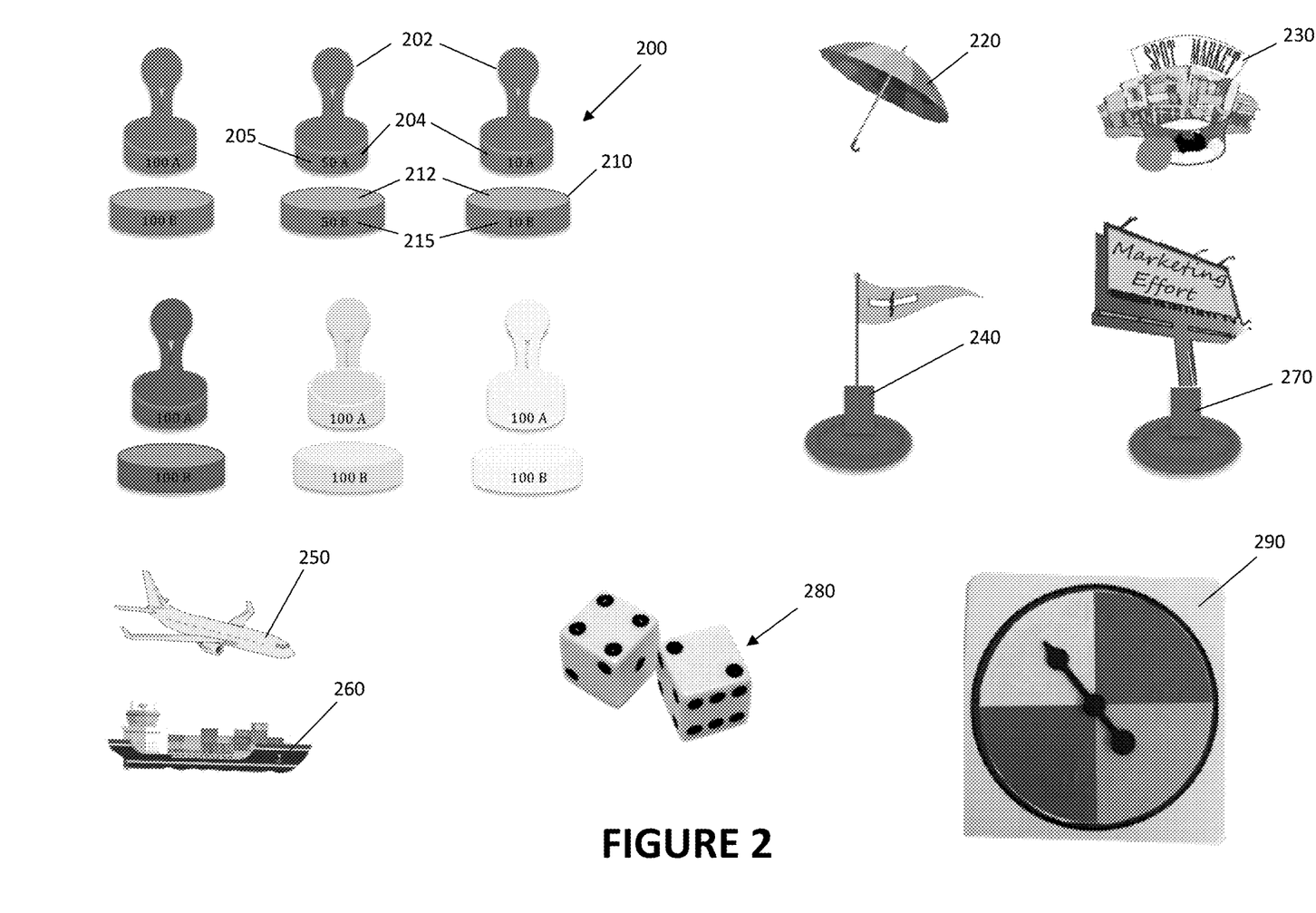
FIG. 2 is a schematic view of game pieces for use with the game board of FIG. 1.

Likewise, FIG. 2 shows a plurality of game pieces configured for use with game board 10. More particularly, multiple sets of color-coded component pieces (shown generally at 200) are provided and designate components that may be combined to form a hypothetical product, which product is subject to supply, manufacture, distribution, and sale through the supply chain segments represented on game board 10. Component pieces 200 are provided in sets matching in color and number to the number and color of player spaces 11 surrounding the various supply chain segment indicia on game board 10. Moreover, each such set includes individual pairs of components, particularly including a first component 202 (representing a component "A" that is to form a part of a finished product during game play) and a second component 210 (representing a component "B" that is to form a part of a finished product during game play). First component 202 preferably includes a flat base 204 allowing first component 202 to rest on a flat surface, and preferably has a handle extending upward from flat base 204 allowing grasping by a player. In contrast, second component 210 preferably has a flat top 212 and a flat bottom, thus forming a generally flat game piece such as a disc or puck. Moreover, flat top 212 of second component 210 is sized so as to receive flat base 204 of first component 202 thereon, such that a single first component 202 and second component 210 may be joined together to represent a single, manufactured product. Further, each of first component 202 and second component 210 includes a magnet, such that each pair consisting of a first component 202 and a second component 210 may be magnetically joined together. Likewise, game board 10 may optionally be formed of a material allowing magnetic attachment of each of first component 202 and second component 210 to game board 10. Preferably, each color-coded set of first components 202 and second components 210 are likewise provided in multiple numeric denominations, such that a single pairing of a first component 202 with a second component 210 may represent multiple manufactured products. Indicia 205 and 215 may be provided on each of first component 202 and second component 210, respectively, indicating the numeric denomination of each such component.

Additionally, color-coded supplier insurance game pieces 220 may be provided, preferably one for each color space 11 provided on game board 10, and more particularly one color-coded supplier insurance game piece 220 having a color matching one color space 11 for each color space 11 provided on game board 10. Further, color-coded spot market game pieces 230 may be provided, preferably one for each color space 11 provided on game board 10, and more particularly one color-coded spot market game piece 230 having a color matching one color space 11 for each color space 11 provided on game board 10. Still further, color-coded production defect game pieces 240 may be provided, preferably one for each color space 11 provided on game board 10, and more particularly one color-coded production defect game piece 240 having a color matching one color space 11 for each color space 11 provided on game board 10.

As mentioned above, air transport game pieces 250 and sea transport game pieces 260 may also be provided and configured for placement within effector spaces 164 on third panel 16 of game board 10. Preferably, one air transport game piece 250 is provided for each color space 11 on game board 10, and more particularly one color-coded air transport game piece 250 having a color matching one color space 11 for each color space 11 provided on game board 10. Similarly, preferably one sea transport game piece 260 is provided for each color space 11 on game board 10, and more particularly one color-coded sea transport game piece 260 having a color matching one color space 11 for each color space 11 provided on game board 10.

With continued reference to FIG. 2, color-coded marketing effort game pieces 270 may be provided, preferably one for each color space 11 provided on game board 10, and more particularly one color-coded marketing effort game piece 270 having a color matching one color space 11 for each color space 11 provided on game board 10.

One or more random number generators 280, such as a pair of dice, are provided for randomizing certain outcomes during game play (as discussed below). Similarly, a random player selector 290 is provided for randomizing additional outcomes during game play (as discussed below). Random player selector may, by way of non-limiting example, comprise a spinner placed on a wheel divided into a plurality of color segments, each color segment having a color matching one color space 11 for each color space 11 provided on game board 10.

Figure 3:
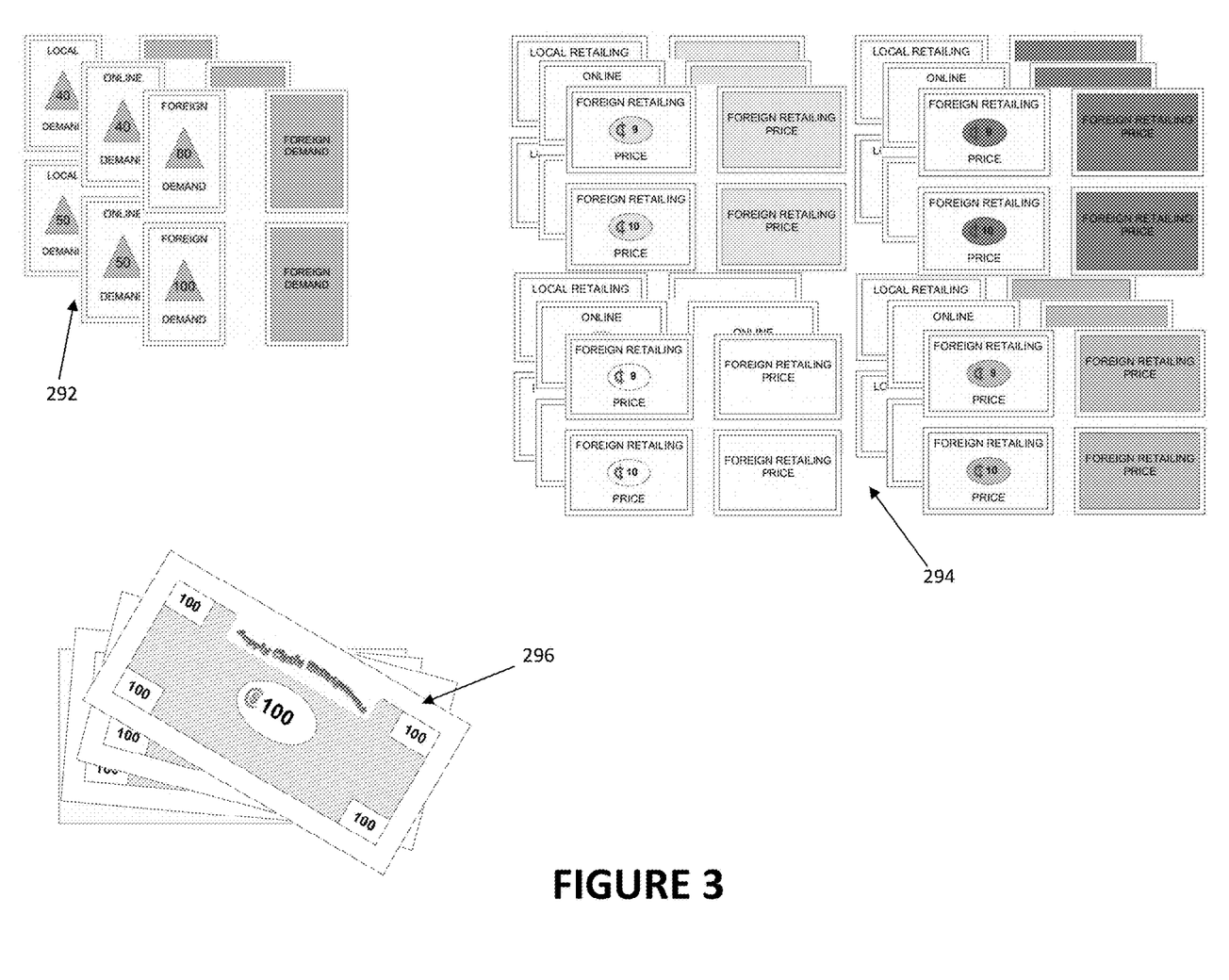
FIG. 3 is a schematic view of game cards and game money for use with the game board of FIG. 1.

Next, and with reference to FIG. 3, other elements of the game system may include a plurality of market demand cards 292 configured for placement on market segment effector spaces 186 of game board 10. Market demand cards 292 may include local demand cards, online demand cards, and foreign demand cards, each of which comprise a set of cards having indicia thereon providing different numerical values representing a demand value to be used on each of local market segment indicia 180, internet market indicia 182, and foreign market indicia 184, respectively. Likewise, a plurality of color-coded price cards 294 are provided, each bearing indicia representing a price that a player will charge for sale of a completed product during game play on fourth panel 18 of game board 10. Specifically, multiple sets of price cards are provided, each set being identical other than the color of the cards, with one set of color-coded price cards 294 cards being provided for each for each color space 11 on game board 10, and more particularly one color-coded set of price cards 294 having a color matching one color space 11 for each color space 11 provided on game board 10. A money pack may also be provided representing money in various denominations that may be used by players during game play, as discussed below.

In accordance with further aspects of an embodiment of the invention, a method of employing the foregoing elements to carry out an educational game configured to simulate various, distinct phases of a product supply chain may be carried out. In an initial setup phase, a number of players up to the number of distinct color spaces 11 on game board 10 is established to play the game. One of those players is selected as a banker responsible for distributing and collecting money 296 to and from the players. Each player selects a color with which they will be associated for the duration of the game, which color matches one of distinct color spaces 11 on game board 10. The banker distributes, e.g., 2000 game dollars to each player, along with each player's color-coded game pieces discussed above and shown in FIG. 2.

In accordance with certain aspects of an embodiment, and by way of summary of the overall game, an objective of each player of the game is to maximize his or her earnings from the supply chain represented on game board 10. Those earnings are produced from selling products after deducting all of the costs in purchasing, making, distributing, and selling those products. The supply chain includes four parties represented on game board 10: namely, a supplier (represented on material supplier segment panel 12), a manufacturer (represented on product manufacturing segment panel 14), distributors (represented on product distribution segment panel 16), and retailers (represented on market segment panel 18).

In order to make one product, each player must first purchase one first component 202 and one second component 210 from the supplier, who is assumed to have unlimited supply capacity. In order to decide how many components to order from the supplier, each player must estimate the demand that will be realized in each of the markets represented on market segment panel 18 of game board 10 (e.g., local market segment 180, online market segment 182, and foreign market segment 184) at the beginning of the game. Preferably, three demand cards 292 are provided for each market, and the actual, realized demand will be determined by using the random number generator (e.g., rolling the dice) during game play.

During the supply segment (represented by material supplier segment panel 12), players will have a, e.g., 1/12 chance of a supply risk, such as a natural disaster impacting his or her cost of supply of first components 202 and second components 210. If a player incurs such a supply risk, that player will be required to pay an additional amount (which may optionally be displayed on spot market effector space 122) to obtain each first component 202 and second component 210. Optionally, a player may avoid such risk by purchasing supplier insurance as discussed below.

After each player has received his or her components from the supplier, each player produces final products (by combining each first component 202 with its associated second component 210) using the manufacturer represented in product manufacturing segment panel 14 of game board 10. A set production price may be established at the start of the game, e.g., 2 game dollars per finished product. As used herein, "game dollar" simply refers to a monetary unit for use in playing the game described herein, and while relative values expressed herein are important to setting higher costs where warranted, specific values may be varied to meet the needs or desires of those skilled in the art without departing from the spirit and scope of the invention.

While as noted above, a set production price may be established at the start of the game, players may also randomly incur an operational risk, in which through use of the random number generator, the user may be assigned an operational risk that reduces the number of finished products they will realize for a given production order. For example, using two six-sided dice, a roll of 7 or higher (representing a 7/12 chance) may assign a, e.g., 10% defect rate to a player's production run, representing 10% defective products being found after inspection. Thus and by way of example, if a player plans to manufacture 100 finished products, that player will only obtain 90 good products if, through his or her dice roll, they incur the designated operational risk; however, they will realize 100 finished products if, through his or her dice roll, they do not incur the designated operational risk.

Next, each player moves his or her finished products (each represented by a first component 202 placed atop a second component 210) to distributors represented by local product distribution indicia 160 and foreign product distribution indicia 162. During game play, products placed on local product distribution indicia 160 represent products to be distributed to both local markets and online markets, while products placed on foreign product distribution indicia 162 represent products to be distributed on foreign markets. Players incur shipping costs for shipment of products to such distribution points represented on product distribution segment panel 16. More particularly, players may incur a cost of, e.g., 1 game dollar per finished product for shipment to a local distributor (represented by local product distribution indicia 160). Likewise, players may incur a cost of, e.g., 1 game dollar per finished product for shipment via sea to a foreign distributor (represented by foreign product distribution indicia 162), and may pay a higher cost, e.g., 2 game dollars/unit for shipment via air to the foreign distributor. In the event that the player elects shipment via sea to a foreign distributor, they may randomly incur a transportation risk, in which through use of the random number generator, the user may be assigned a transportation risk that increases the cost of shipment of his or her products by sea to the foreign distributor. For example, using two six-sided dice, a roll of 12 (representing a 1/12 chance) may assign a, e.g., higher shipment price of 2 game dollars per finished product for shipment via sea to the foreign distributor.

Players make earnings by selling products according to the realized demand in each market segment represented on market segment panel 18 of game board 10. Players may agree upon a fixed sales price at the start of the game, e.g., 10 game dollars per finished product, or may alternatively individually price his or her items using color-coded price cards 294 as discussed in greater detail below. Optionally, players may ship products between distributors to reapportion the number of finished products to be distributed in each market represented on market segment panel 18, e.g. by paying a transshipment fee, e.g., 2 game dollars per finished product.

Optionally, in the event that players have excess products after selling, those excess products may be salvaged, e.g., at a price of 1 game dollar per finished product. Likewise, players may opt to keep excess products for inclusion in each respective player's product inventory for the next game run, as discussed in more detail below.

Players may then repeat the foregoing process through successive runs, e.g. until all but one players are bankrupt, or until a predetermined amount of time has passed, or until a predetermined number of runs of the game have been carried out.

The following provides a more detailed explanation of the foregoing game method. At the outset, all of the players preferably decide upon a pricing strategy for finished products. In the event that all players agree upon a fixed price strategy (e.g., all finished products selling for a fixed price of 10 game dollars in each market segment reflected on market segment panel 18 of game board 10), then price cards 294 are not used. In the event that all players agree on individualized pricing strategy, then price card 294 are used in accordance with the individualized pricing game play discussed below. Each player independently estimates the demand for finished products in each of the market segments reflected on market segment panel 18 of game board 10, and computes his or her total finished product demand by adding the demand in each market.

Next, players engage the material supplier segment of the supply chain represented by game board 10. First, each player decides how many of each of first component 202 and second component 210 they wish to order from the supplier by considering the possible operational risk as discussed above. Each player purchases the number of first components 202 and second components 210 they desire. Each player then decides on whether to purchase supplier insurance, and in the event that they elect such supplier insurance and pay the insurance fee to the banker, the player electing insurance may place his or her color-coded supplier insurance game piece 220 in supplier insurance designator effector space 124. If a player does not elect to purchase such supplier insurance, that player rolls both dice in order to randomly determine whether they incur a supply risk. If such player rolls, e.g., double 2's, double 4's, or double 6's, that player places his or her color-coded spot market game piece 230 in spot market designator effector space 122. Each player then pays to the banker according to the number of components they have decided to purchase, with those players that purchased supplier insurance paying a first price (e.g., 1 game dollar per each first component 202 and second component 210), and those players that did not purchase supplier insurance but that incurred a supplier risk (and thus have placed his or her color-coded spot market game piece 230) paying a second, higher price (e.g., 1.50 game dollars per each first component 202 and second component 210). Each player then receives his or her respective color-coded first components 202 and second components 210 and places them on his or her designated color space 11 on material supplier segment panel 12.

Next, players engage the product manufacturing segment of the supply chain represented by game board 10. As discussed above, each player rolls both dice, and upon a roll of 7 or greater, the player is determined to have incurred production defects and thus places his or her color-coded production defect game piece 240 in production defects effector space 142. Each player then combines his or her respective first components 202 and second components 210 to represent finished, manufactured products, and moves the combined, finished products to his or her designated color space 11 on product manufacturing segment panel 14. If a player has a production defect game piece 240 in effector space 142, his or her total number of finished products is reduced by 10% (although such player still pays for the manufacture of such defective products). Each player pays the banker for his or her production.

Next, players engage the product distribution segment of the supply chain represented by game board 10. Each player decides how many products are to be shipped for each of local product distribution 160 and foreign product distribution 162, and moves his or her combined component pieces 200 to his or her designated color spaces 11 on product distribution segment panel 14. The player will base his or her decision of how many products to ship for each of local product distribution 160 and foreign product distribution 162 based on the player's initial estimation of market demand made at the beginning of the game (with local product distribution 160 distributing products to both local market segment indicia 180 and online market segment indicia 182). Each player decides on the mode of transportation to be used to transfer combined component pieces 200 representing his or her finished products to foreign product distribution 162. If the player elects air transport, they place their color-coded air transport mode game piece 250 in the product distribution segment effector space 164 adjacent his or her associated color spot 11 on product distribution segment panel 16, and pays the associated transport fee (e.g., 2 game dollars per finished product). Likewise, if the player elects sea transport, they place their color-coded sea transport mode game piece 260 in the product distribution effector space 164 adjacent his or her associated color sport 11 on product distribution segment panel 16. However, for players electing sea transport, each such player rolls both of the dice to randomly determine whether they incur a transportation delay. In the event that any such player rolls double 2's, double 4's, or double 6's, they are designated as having incurred a transportation delay. For players that elected sea transport that do not incur a transportation delay, they pay the associated transport fee that is lower than the air shipment transport fee (e.g., 1 game dollar per finished product). However, for players that elected sea transport that do incur a transportation delay, they pay a higher transport fee of an additional 2 game dollars per finished product, and thus incur an overall higher transport expense than had they elected air transport. Each player then pays the associated transportation costs to the banker.

Finally, players engage the market segment of the supply chain represented by game board 10. Here, the banker may use random player selector 290 to select a player to designate product demand in each of local market segment 180, online market segment 182, and foreign market segment 184. More particularly, it the random player selector 290 points to the color red, the player associated with the red color spot 11 on game board 10 rolls both dice. If the result is a value≤5, a demand card 292 for the associated market segment 180, 182, or 184 having the lowest available value is placed in the associated market segment effector space 186. If the result is a value of 6 or 8, a demand card 292 for the associated market segment 180, 182, or 184 having an intermediate value (i.e., between the high and low values on the demand cards 292 for that market segment) is placed in the associated market segment effector space 186. Likewise, if the result is a value≥9, a demand card 292 for the associated market segment 180, 182, or 184 having the highest available value is placed in the associated market segment effector space 186. If the player rolls a 7, the player is instructed to roll again until a number other than 7 results from the roll. Thereafter, each player moves his or her finished products to his or her color space 11 adjacent the associated market. Such process is then repeated for each of the remaining market segments. Notably, the specific demand values may differ among market segments 180, 182, and 184.

Players may have the option of conducting transshipments between distributors based upon the realized demand determined as outlined above. More particularly, if a player has excess products at local distributor 160 but inadequate supply at foreign distributor 162 to meet the realized market demands in market segments 180, 182, and 184, they may move some of their finished product pieces 200 from local distributor 160 to foreign distributor 162 at a cost of, e.g., 2 game dollars per finished product. Likewise, if any players have excess products remaining after selling on market segment panel 18 of game board 10, they may have the option of salvaging such excess, unsold product at a price of, e.g., 1 game dollar per product. If all players agree to keep the excess product for the inventory of the next game run, they may do so in accordance with the advance play discussion set forth below.

Each player then collects from the bank the revenue resulting from the sales of his or her products. Following the collection of such revenue, the players may select their product pricing strategy and their inventory strategy and continue the game for another run until one or more players are bankrupt.

Optionally and in accordance with further aspects of an embodiment, players may engage additional and more challenging aspects of the game. More particularly, players may elect to compete on selling prices in each of the market segments on market segment panel 18. As a result, while a higher price in a given market may offer a player the potential of increased revenue, if a player's price is higher than that of another player in a given market on market segment panel 18, that player with the higher price will realize a lower demand. In order to carry out such price-competitive play mode, each player sets a selling price in each market using his or her color-coded price cards 294, which preferably include at least three pricing values—a low price, a mid price, and a high price. Each player places his or her selected color-coded price card 294 for each market segment 180, 182, and 184 face down so as to not reveal his or her selected price to other players. Each player may then select whether or not to invest in marketing efforts to increase product demand. If a player elects to invest in marketing efforts, they pay a marketing fee (e.g., 50 game dollars) to the banker, and place his or her color-coded marketing effort game piece 270 on product marketing effort effector space 188 on market segment panel 18 of game board 10. By investing in marketing efforts, the associated player's demand is increased by 10%—thus, e.g., if the realized demand in one of market segments 180, 182, and 184 is 50 units, the demand for products of the player that so invested in marketing efforts increases to 55 units. During the market segment of game play (with all other segments being carried out as described above), each player flips over his or her color-coded price cards 294 to reveal his or her local, online, and foreign prices. If a player has selected a price that is 1 game dollar higher than the lowest revealed price for a given market, that player loses 10% of the realized demand for that market. Likewise, if a player has selected a price that is 2 game dollars higher than the lowest revealed price for a given market, that player loses 20% of the realized demand for that market. Thus, and by way of non-limiting example, assume that the red player sets the lowest price at 10 game dollars, and the white player sets his price at 11 game dollars. The dice roll generates a realized demand of 100 units in a given market segment. The actual demand for the white player for that market segment is then 100−(100*10%)=90 units, and if that player has a sufficient number of units to meet that demand, his revenue will be 11*90 units=990 game dollars. If the white player has previously invested in marketing efforts and placed his color-coded marketing effort game piece 270, his realized demand will be (100−(100*10%)*110%=99 units. Each player collects his or her revenue from the banker for units sold as explained above, after deducting any associated marketing effort costs.

Optionally and as referenced briefly above, at the end of the game, players may elect to keep an excess products as inventory for the next game run. Preferably, players must pay a fee, e.g., 4 game dollars per finished product, for each such retained product, and in order to succeed and continue on with the game, each player will need to independently insure that they have sufficient cash flow to order components to meet anticipated demand in the next game run.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. For example, while to foregoing description sets out a physical embodiment of game board 10 and associated game pieces for carrying out the educational gaming method, those skilled in the art will recognize that electronic embodiments in the form of computer software executed by a computer processor may also be provided. Likewise, while specific pricing, monetary amounts, costs, risks, and other values are disclosed herein, such values are presented as only illustrative examples of ways for carrying out the invention, and are not intended to limit the scope of the invention. It should be understood, therefore, that the invention may be practiced otherwise than as specifically set forth herein.

What is claimed is:

1. An educational supply chain management board game, comprising:
    a game board comprising a plurality of panels, each said panel including indicia designating a distinct phase of a supply chain, and each said panel including at least one set of a fixed number of a plurality of player spots, wherein a first one of said player spots in each set of player spots on each said panel is provided in a first color that may be associated with a first player, and a second one of said player spots in each set of player spots on each said panel is provided in a second color that may be associated with a second player, wherein said second color is distinct from said first color, and wherein each said set of player spots on each said panel is identical to each other set of player spots on said game board, and wherein each said set of player spots on each said panel surrounds a distinct supply chain segment indicia, all of which distinct supply chain segment indicia thematically relate to a different phase of a supply chain;
    a plurality of first game piece components, each said first game piece component having a flat base, said plurality of first game piece components being provided in said fixed number of color-coded sets matching said distinct colors of said plurality of player spots, and wherein a first one of said first game piece components is provided in said first color, and a second one of said first game piece components is provided in said second color;
    a plurality of second game piece components of a different shape from said first game piece components and equal in number and color to said plurality of first game piece components, each said second game piece component having a flat top side and a flat bottom side, wherein said flat top side of each said second game piece component is sized to receive a flat base of one of said first game piece components thereon, and wherein a first one of said second game piece components is provided in said first color, and a second one of said second game piece components is provided in said second color;
    wherein each said first game piece component and each said second game piece component are configured for temporary attachment to one another to enable moving as a single unit by manipulating only one of either said first game piece component or said second game piece component; and
    at least one random number generator.

2. The educational supply chain management board game of claim 1, further comprising:
    a plurality of supplier insurance game pieces equal in number and color to said distinct colors of said plurality of player spots; and
    a plurality of spot market game pieces equal in number and color to said distinct colors of said plurality of player spots.

3. The educational supply chain management board game of claim 1, further comprising:
    a plurality of production defect game pieces equal in number and color to said distinct colors of said plurality of player spots.

4. The educational supply chain management board game of claim 1, further comprising:
    a plurality of sets of transportation mode game pieces, wherein each said set of transportation mode game pieces is equal in number and color to said distinct colors of said plurality of player spots.

5. The educational supply chain management board game of claim 1, further comprising:
    a plurality of marketing effort game pieces equal in number and color to said distinct colors of said plurality of player spots.

6. The educational supply chain management board game of claim 1, said plurality of panels further comprising:
    a first panel including indicia designating said first panel as a material supplier supply chain segment panel;
    a second panel attached to said first panel and including indicia designating said second panel as a product manufacturing supply chain segment panel;
    a third panel attached to said second panel and including indicia designating said third panel as a product distribution supply chain segment panel; and
    a fourth panel attached to said third panel and including indicia designating said fourth panel as a market supply chain segment panel.

7. The educational supply chain management board game of claim 6, further comprising a deck of product demand cards, said deck of product demand cards further comprising:
    a set of local demand cards bearing indicia matching a local product demand indicia on said fourth panel;
    a set of online demand cards bearing indicia matching an online product demand indicia on said fourth panel; and
    a set of foreign demand cards bearing indicia matching a foreign product demand indicia on said fourth panel.

* * * * *